H. T. NEWBIGIN.
JOURNAL AND LIKE BEARING.
APPLICATION FILED AUG. 11, 1919.

1,405,317.

Patented Jan. 31, 1922.
2 SHEETS—SHEET 1.

Witnesses

Inventor
Henry T. Newbigin,
by
Attorney.

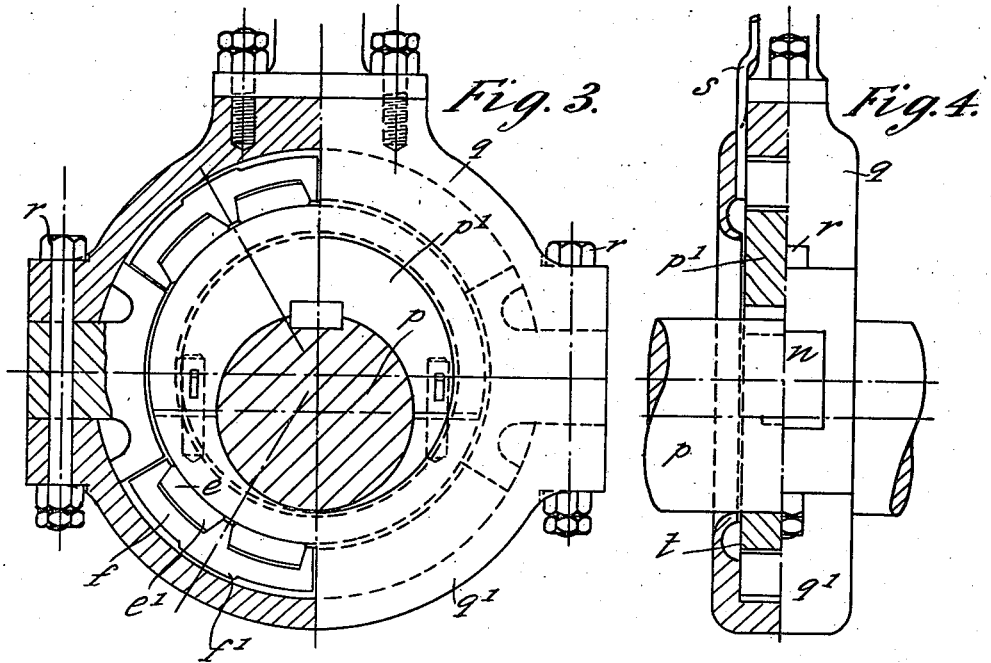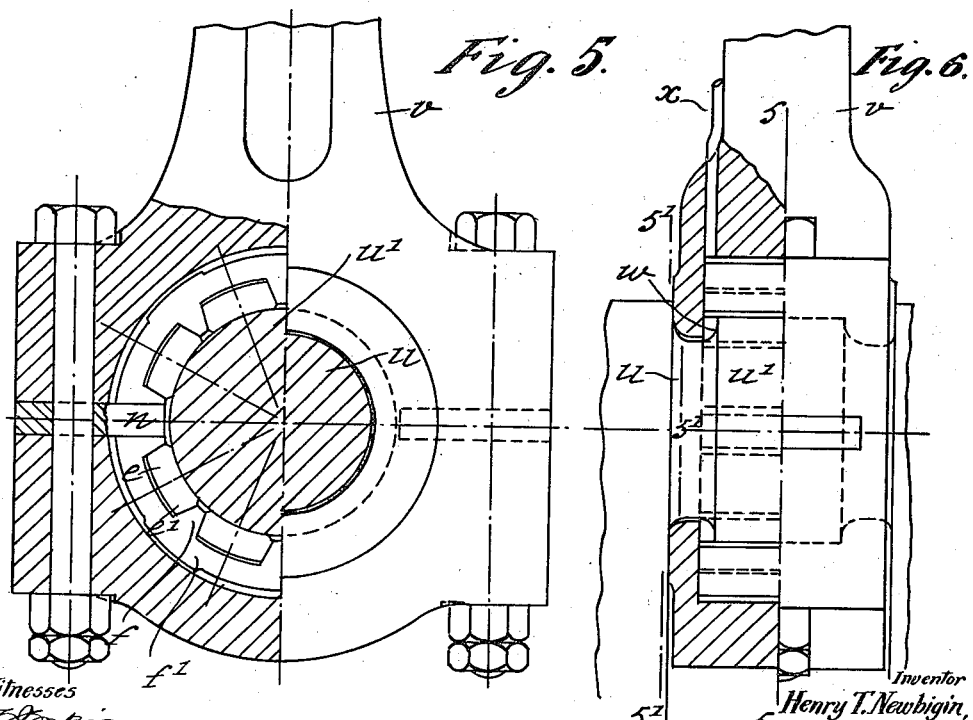

UNITED STATES PATENT OFFICE.

HENRY T. NEWBIGIN, OF NEWCASTLE-UPON-TYNE, ENGLAND, ASSIGNOR TO MICHELL BEARINGS LIMITED, OF LONDON, ENGLAND.

JOURNAL AND LIKE BEARING.

1,405,317.  Specification of Letters Patent.  Patented Jan. 31, 1922.

Application filed August 11, 1919. Serial No. 316,850.

*To all whom it may concern:*

Be it known that I, HENRY THORNTON NEWBIGIN, a subject of the King of Great Britain, residing in Newcastle-upon-Tyne, England, have invented certain new and useful Improvements in Journal and like Bearings, of which the following is a specification.

My invention relates to journal and like bearings of the type in which the stationary or fixed surface of the bearing consists of a plurality of separate pivoted or rocking bearing blocks or splints which automatically generate high pressure oil films and among which the load is equally distributed. It consists in an improved construction which is easy to manufacture and in which equal distribution of the load is obtained by balancing the blocks in pairs, each pair being supported on a small housing or member which is arranged to rock slightly on an external supporting projection carried on the housing of the bearing. The cross section of the supporting members is preferably so designed that the members may be formed and rolled in long bars and be cut off to the necessary lengths. The section of the blocks may likewise be such that the blocks can be rolled or drawn through dies and be cut off to lengths.

Figure 1:
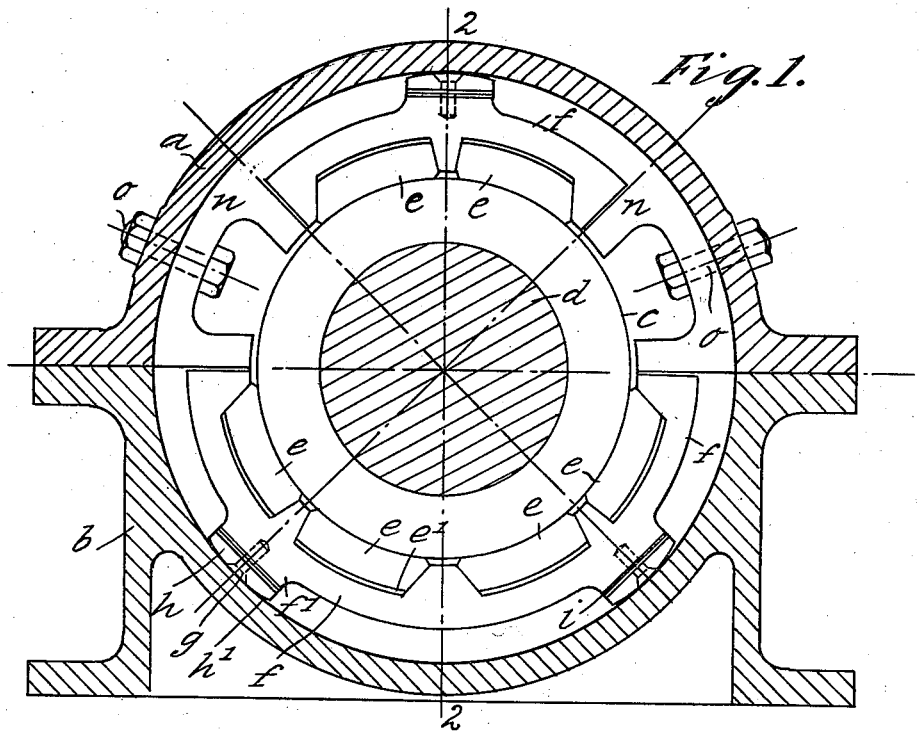
Figure 2:
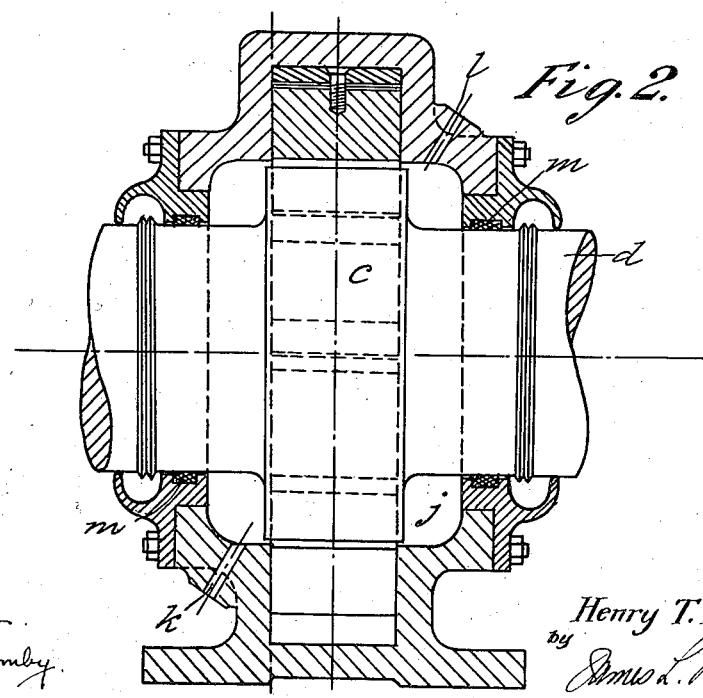

I will describe my invention with reference to the accompanying drawings, in which Fig. 1 is a transverse vertical section of a journal bearing embodying the improved construction, Fig. 2 being a section on line 2—2 of Fig. 1; Figs. 3 and 4 are two half elevational and half sectional views taken at right angles to one another, of an eccentric and strap having the invention applied, and Figs. 5 and 6 illustrate the invention applied to a bearing between a crank pin and a connecting rod, Fig. 5 being two half sections on lines 5, 5 and 5', 5' of Fig. 6 which is a half elevation and half section of one end of the connecting rod. In the different figures corresponding parts are denoted by the same reference letters.

In the arrangement shown in Figs. 1 and 2, *a* and *b* are the upper and lower housings of the bearing. The journal *c* of the shaft *d* is arranged to rotate in contact with the inner surfaces of blocks *e*, which are disposed in pairs, each pair being supported symmetrically or in balanced relation in a small housing or member *f* which by means of an externally projecting part *f'* is capable of rocking slightly on the adjacent housing *a* or *b*. To the back of each projection *f'* is detachably secured by any suitable means, as for instance by studs *g*, a piece *h* that has a rounded back *h'* capable of rocking on the housing of the bearing.

The blocks *e* are so mounted in the supporting members *f*, as for example by appropriately rounding their backs *e'*, that they can rock on said members to a small extent.

To enable the position of the axis of the shaft *d* to be adjusted with respect to the bearing housing, one or more liners or shims *i* may be interposed between a projection *f'* and the corresponding rocking piece *h*. Such provision is particularly advantageous in the case of shafts of steam turbines wherein the turbine blades have very small "tip" clearance.

In Fig. 2 an inlet for the supply of oil to an oil cavity or chamber *j* is shown at *k* and an outlet at *l*. Oil baffles are indicated at *m*.

Abutment pieces or stops *n* secured to the bearing housing in any suitable way, as by bolts *o*, may be provided to constitute in conjunction with members *f* a complete circle and thereby prevent the members *f* from turning about the axis of the journal *c*.

Units comprising a pair of blocks *e* in a supporting member *f* as above described, may be applied to vertical or inclined shafts as well as to horizontal shafts. I prefer to fit three such units in the case of a shaft bearing and where the shaft is vertical they may be equally spaced around it, but for a horizontal shaft the better plan is to place two of the three units in the lower half circle of the bearing which normally carries the load.

In some cases the upper half of the bearing may be an ordinary journal bearing without blocks *e* and members *f*.

In Figs. 3 and 4 the invention is shown applied to a bearing for a shaft *p* having an eccentric *p'* and embraced by a strap comprising the two parts *q*, *q'* held together by the bolts *r*. Preferably, the strap is allowed to overlap the sides of the eccentric so as to retain oil, admitted by an oil pipe *s*, in the oil cavity *t* provided for the purpose.

In the arrangement shown in Figs. 5 and 6, where the invention is applied to a bearing for a crank pin $u$ and associated connecting rod $v$, a cavity $w$ for the oil, that can be admitted by pipe $x$ may be formed as shown by increasing the diameter of the crank pin $u$ as indicated at $u'$.

It will be seen, in each of the several constructions illustrated, that both the blocks $e$ and also the supporting members $f$ have cross sections such that they can be easily rolled in long bars and cut off to the requisite lengths.

What I claim as my invention is:—

1. A bearing comprising relatively stationary upper and lower main bearing housings having inner circumferential faces, a plurality of smaller housings rockably mounted on the said circumferential faces of the main housings and having recessed inner faces, a pair of separate bearing blocks disposed in balanced relation and rockably supported on each recessed housing and having their inner faces adapted to contact with the face of the rotatable member to be supported, and means carried by the main housings and independent of said bearing blocks to prevent the smaller housings turning about the axis of the rotatable member.

2. A bearing comprising relatively stationary upper and lower main bearing housings having inner circumferential faces, a plurality of smaller housings having recessed inner faces, said recessed housings being arranged side by side and rockably mounted on the circumferential faces of the main housings, a pair of rockably supported bearing blocks disposed in balanced relation on each recessed housing and having their inner faces adapted to contact with the face of the rotatable member to be supported, and abutment stops removably fixed to the main bearing housings and interposed between adjacent sides of pairs of recessed housings for preventing the latter housings from turning about the axis of the rotatable member.

3. A bearing comprising relatively stationary upper and lower main bearing housings having inner circumferential faces, a plurality of smaller housings having recessed inner faces and rockably mounted on the circumferential faces of the main housings, a pair of rockably supported bearing blocks disposed in balanced relation on each recessed housing, the inner faces of said blocks being adapted to contact with the face of the rotatable member to be supported, means carried by the main housings for preventing the smaller housings from turning about the axis of the rotatable member, and adjustable means for positioning the axis of the said rotatable member with respect to the main bearing housings.

4. A bearing comprising relatively stationary upper and lower main bearing housings having inner circumferential faces, a plurality of smaller housings having recessed inner faces and rockably mounted on the said circumferential faces of the main housings, and a pair of rockably supported bearing blocks disposed in balanced relation on each recessed housing and having their inner faces adapted to contact with the face of the rotatable member to be supported, means carried by the main housings for preventing the smaller housings from turning about the axis of the rotatable member, and adjustable means for positioning the axis of the rotatable member with respect to the main bearing housings, said adjustable means consisting of rocking pieces removably secured to the outer surfaces of the recessed housings, said pieces having rounded faces adjacent the circumferential faces of the main housings, and removable liners interposed between said pieces and the recessed housings.

Signed at Newcastle-upon-Tyne, England, this 9th day of July, 1919.

H. T. NEWBIGIN.

In the presence of—
PERCY GORDEN,
R. W. RIDLEY.